(12) United States Patent
Miura et al.

(10) Patent No.: US 9,244,910 B2
(45) Date of Patent: Jan. 26, 2016

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Yasuhide Miura, Kanagawa (JP); Keigo Hattori, Kanagawa (JP); Tomoko Okuma, Kanagawa (JP)

(73) Assignee: FUJI XEROX CO., LTD, Tohyo (JP)

( * ) Notice: Subject to any disclaimer, the term of this patent is extended or adjusted under 35 U.S.C. 154(b) by 0 days.

(21) Appl. No.: 14/266,966

(22) Filed: May 1, 2014

(65) Prior Publication Data

US 2015/0106080 A1 Apr. 16, 2015

(30) Foreign Application Priority Data

Oct. 10, 2013 (JP) ................................. 2013-212825

(51) Int. Cl.
*G06F 17/27* (2006.01)
*G06F 17/28* (2006.01)

(52) U.S. Cl.
CPC .................................. *G06F 17/2785* (2013.01)

(58) Field of Classification Search
CPC ... G06F 17/27; G06F 17/271; G06F 17/2785; G10L 15/18; G10L 15/1822; G10L 15/265; G10L 21/10
USPC ................................. 704/204, 9, 10, 251, 270
See application file for complete search history.

(56) References Cited

U.S. PATENT DOCUMENTS

2012/0179751 A1* 7/2012 Ahn et al. ...................... 709/204
2014/0088954 A1* 3/2014 Shirzadi et al. ................... 704/9
2015/0073774 A1* 3/2015 Becker et al. ..................... 704/9

FOREIGN PATENT DOCUMENTS

JP       2005-339412 A     12/2005
JP        2007-58863 A      3/2007
JP       2013-134751 A      7/2013

OTHER PUBLICATIONS

David M. Blei, et al., "Latent Dirichlet Allocation", Journal of Machine Learning Research, Jan. 2003, pp. 993-1022, vol. 3.
Chenghua Lin, "Weakly Supervised Joint Sentiment-Topic Detection from Text", IEEE Transactions on Knowledge and Data Engineering, Jun. 2012, pp. 1134-1145, vol. 24, No. 6.

(Continued)

*Primary Examiner* — Thierry L Pham
(74) *Attorney, Agent, or Firm* — Sughrue Mion, PLLC

(57) ABSTRACT

An information processing apparatus includes a receiving unit, a determining unit, a first assigning unit, an extracting unit, a second assigning unit, a modeling unit, and an output unit. The receiving unit receives a target character string. The determining unit determines whether a sentiment character string is included in the received character string. A first assigning unit assigns a label corresponding to a sentiment character string to the character string when the sentiment character string is included, and assigns plural labels to the character string when no sentiment character string is included. The extracting unit extracts a word from the character string. The second assigning unit assigns to the extracted word a label which has been assigned to the character string that includes the word. The modeling unit performs supervised topic modeling for the character string. The output unit outputs a result of a process by the modeling unit.

8 Claims, 16 Drawing Sheets

(56) References Cited

OTHER PUBLICATIONS

Daniel Ramage, et al., "Characterizing Microblogs with Topic Models", Proceedings of the Fourth International AAAI Conference on Weblogs and Social Media, pp. 130-137.

Alec Go, et al., "Twitter Sentiment Classification using Distant Supervision", Technical report, 2009, Stanford University.

Daniel Ramage, "Partially Labeled Topic Models for Interpretable Text Mining", Proceedings of the 17th ACM SIGKDD international conference on Knowledge discovery and data mining, Aug. 21-24, 2011, pp. 457-465.

Christopher D. Manning, "Text classification and Naive Bayes", Introduction to Information Retrieval, 2008, pp. 234-265, Cambridge University Press.

\* cited by examiner

FIG. 4

| ID | TEXT |
|---|---|
| 1 | AUTUMN COLORS AT MOUNT YMM IS BEING FEATURED ON TV. THAT'S GOOD. |
| 2 | I'VE BEEN EATING COLD STUFF TOO MUCH BECAUSE IT'S BEEN TOO HOT, AND AM NOW SUFFERING FROM A SORE STOMACH. (´・ω・`) |
| 3 | I WENT HIKING TO MOUNT YMM LAST WEEKEND ＼(^o^)／ |
| 4 | IT'S BEEN SUDDENLY CHILLY SINCE THE BEGINNING OF SEPTEMBER, AND NOW I GOT A COLD orz |
| 5 | I FEEL SLUGGISH. I MIGHT HAVE GOT A COLD (´・ω・`) |
| 6 | AUTUMN COLORS AT T STREAM WERE BEAUTIFUL. |
| 7 | A DUST STORM BY STRONG WIND IS CAUSING SORES IN MY EYES. |
| 8 | I JUST DRANK A CUP OF COFFEE. A MORNING CUP OF COFFEE IS YUMMMY (´▽`)／ |
| 9 | I CALLED IT A DAY! IT'S FRIDAY, I'M GONNA HAVE A DRINK!! |
| 10 | I ATE RAMEN AT WESTGATE OF Y STATION THIS WEEK AS WELL. IT WAS REALLY YUMMMY. |
| ... | ... |

410 = ID, 420 = TEXT, 400

FIG. 5

| TEXT REPRESENTATION | NAME | SENTIMENT INFORMATION |
|---|---|---|
| (´▽`)／ | DELIGHTED FACE | POSITIVE |
| orz | FALLEN OVER PERSON | NEGATIVE |
| ＼(^o^)／ | CHEERING FACE | POSITIVE |
| (´・ω・`) | DEPRESSED FACE | NEGATIVE |

| ID | TEXT |
|---|---|
| 1 | AUTUMN COLORS AT MOUNT YMM IS BEING FEATURED ON TV. THAT'S GOOD. |
| 2 | I'VE BEEN EATING COLD STUFF TOO MUCH BECAUSE IT'S BEEN TOO HOT, AND AM NOW SUFFERING FROM A SORE STOMACH. (´・ω・`) |
| 3 | I WENT HIKING TO MOUNT YMM LAST WEEKEND ＼(ˆoˆ)／ |
| 4 | IT'S BEEN SUDDENLY CHILLY SINCE THE BEGINNING OF SEPTEMBER, AND NOW I GOT A COLD orz |
| 5 | I FEEL SLUGGISH. I MIGHT HAVE GOT A COLD (´・ω・`) |
| 6 | AUTUMN COLORS AT T STREAM WERE BEAUTIFUL. |
| 7 | A DUST STORM BY STRONG WIND IS CAUSING SORES IN MY EYES. |
| 8 | I JUST DRANK A CUP OF COFFEE. A MORNING CUP OF COFFEE IS YUMMMY (´▽`)／ |
| 9 | I CALLED IT A DAY! IT'S FRIDAY, I'M GONNA HAVE A DRINK!! |
| 10 | I ATE RAMEN AT WESTGATE OF Y STATION THIS WEEK AS WELL. IT WAS REALLY YUMMMY. |
| ... | ... |

⬇ EXTRACT TOPIC

600

| SENTIMENT INFORMATION | TOPIC (IN DESCENDING ORDER OF PROBABILITY VALUES OF WORDS) |
|---|---|
| ABSENT | DRINK, YUMMMY, RAMEN, COFFEE, EAT, FRIDAY, !, .... |
| ABSENT | MOUNT YMM, AUTUMN COLORS, GOOD, BEAUTIFUL T STREAM, HIKING, WEEKEND, .... |
| ABSENT | SORE, HOT, COLD, GET, CHILLY, EYES, DUST, STOMACH, SLUGGISH, .... |
| ... | ... |

FIG. 7
RELATED ART

| ID | TEXT |
|---|---|
| 1 | AUTUMN COLORS AT MOUNT YMM IS BEING FEATURED ON TV. THAT'S GOOD. |
| 2 | I'VE BEEN EATING COLD STUFF TOO MUCH BECAUSE IT'S BEEN TOO HOT, AND AM NOW SUFFERING FROM A SORE STOMACH. (´・ω・`) |
| 3 | I WENT HIKING TO MOUNT YMM LAST WEEKEND ＼(´o`)／ |
| 4 | IT'S BEEN SUDDENLY CHILLY SINCE THE BEGINNING OF SEPTEMBER, AND NOW I GOT A COLD orz |
| 5 | I FEEL SLUGGISH. I MIGHT HAVE GOT A COLD (´・ω・`) |
| 6 | AUTUMN COLORS AT T STREAM WERE BEAUTIFUL. |
| 7 | A DUST STORM BY STRONG WIND IS CAUSING SORES IN MY EYES. |
| 8 | I JUST DRANK A CUP OF COFFEE. A MORNING CUP OF COFFEE IS YUMMMY (´▽`)／ |
| 9 | I CALLED IT A DAY! IT'S FRIDAY, I'M GONNA HAVE A DRINK!! |
| 10 | I ATE RAMEN AT WESTGATE OF Y STATION THIS WEEK AS WELL. IT WAS REALLY YUMMMY. |
| ... | ... |

⬇ EXTRACT TOPIC

| EMOTICON | SENTIMENT INFORMATION | TOPIC (IN DESCENDING ORDER OF PROBABILITY VALUES OF WORDS) |
|---|---|---|
| (´▽`)／ | POSITIVE | YUMMMY, COFFEE, .... |
| ＼(´o`)／ | POSITIVE | MOUNT YMM, HIKING, WEEKEND, .... |
| (´・ω・`) | NEGATIVE | SORE, HOT, COLD, GET, CHILLY, STOMACH, .... |
| orz | NEGATIVE | COLD, GET, CHILLY, .... |
| ... | ... | ... |

FIG. 8
RELATED ART

| ID | TEXT |
|---|---|
| 1 | AUTUMN COLORS AT MOUNT YMM IS BEING FEATURED ON TV. THAT'S GOOD. |
| 2 | I'VE BEEN EATING COLD STUFF TOO MUCH BECAUSE IT'S BEEN TOO HOT, AND AM NOW SUFFERING FROM A SORE STOMACH.(´･ω･`) |
| 3 | I WENT HIKING TO MOUNT YMM LAST WEEKEND ＼(ˆoˆ)／ |
| 4 | IT'S BEEN SUDDENLY CHILLY SINCE THE BEGINNING OF SEPTEMBER, AND NOW I GOT A COLD orz |
| 5 | I FEEL SLUGGISH. I MIGHT HAVE GOT A COLD (´･ω･`) |
| 6 | AUTUMN COLORS AT T STREAM WERE BEAUTIFUL. |
| 7 | A DUST STORM BY STRONG WIND IS CAUSING SORES IN MY EYES. |
| 8 | I JUST DRANK A CUP OF COFFEE. A MORNING CUP OF COFFEE IS YUMMMY (´▽`)／ |
| 9 | I CALLED IT A DAY! IT'S FRIDAY, I'M GONNA HAVE A DRINK!! |
| 10 | I ATE RAMEN AT WESTGATE OF Y STATION THIS WEEK AS WELL. IT WAS REALLY YUMMMY. |
| ... | ... |

EXTRACT TOPIC

| SENTIMENT INFORMATION | TOPIC (IN DESCENDING ORDER OF PROBABILITY VALUES OF WORDS) |
|---|---|
| POSITIVE | MOUNT YMM, AUTUMN COLORS, GOOD, BEAUTIFUL, T STREAM, .... |
| NEGATIVE | SORE, HOT, COLD, GET, CHILLY, EYES, DUST, STOMACH, SLUGGISH, .... |
| ... | ... |

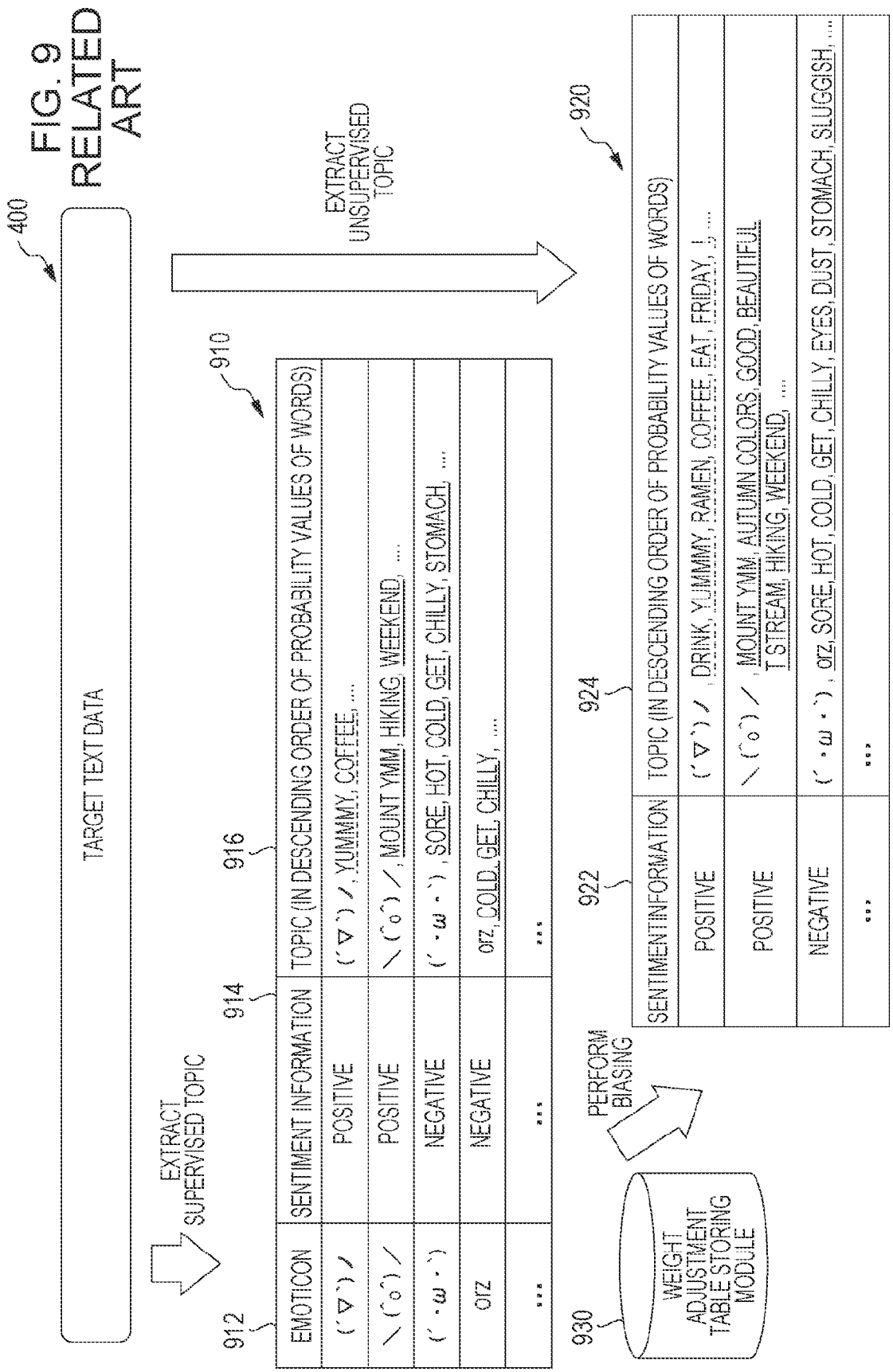

FIG. 11

| ID | TEXT |
|---|---|
| 1 | AUTUMN COLORS AT MOUNT YMM IS BEING FEATURED ON TV. THAT'S GOOD. |
| 2 | I'VE BEEN EATING COLD STUFF TOO MUCH BECAUSE IT'S BEEN TOO HOT, AND AM NOW SUFFERING FROM A SORE STOMACH. (´・ω・`) |
| 3 | I WENT HIKING TO MOUNT YMM LAST WEEKEND ＼(^o^)／ |
| 4 | IT'S BEEN SUDDENLY CHILLY SINCE THE BEGINNING OF SEPTEMBER, AND NOW I GOT A COLD orz |
| 5 | I FEEL SLUGGISH. I MIGHT HAVE GOT A COLD (´・ω・`) |
| 6 | AUTUMN COLORS AT T STREAM WERE BEAUTIFUL. |
| 7 | A DUST STORM BY STRONG WIND IS CAUSING SORES IN MY EYES. |
| 8 | I JUST DRANK A CUP OF COFFEE. A MORNING CUP OF COFFEE IS YUMMMY (´▽`)／ |
| 9 | I CALLED IT A DAY! IT'S FRIDAY, I'M GONNA HAVE A DRINK!! |
| 10 | I ATE RAMEN AT WESTGATE OF Y STATION THIS WEEK AS WELL. IT WAS REALLY YUMMMY. |
| ... | ... |

EXTRACT TOPIC

| SENTIMENT INFORMATION | TOPIC (IN DESCENDING ORDER OF PROBABILITY VALUES OF WORDS) |
|---|---|
| POSITIVE | DRINK, YUMMMY, RAMEN, COFFEE, EAT, FRIDAY, !, .... |
| POSITIVE | MOUNT YMM, AUTUMN COLORS, GOOD, BEAUTIFUL T STREAM, HIKING, WEEKEND, .... |
| NEGATIVE | SORE, HOT, COLD, GET, CHILLY, EYES, DUST, STOMACH, SLUGGISH, .... |
| DELIGHTED FACE | (´▽`)／, ♪, ☆, .... |
| ... | ... |

FIG. 12

| TEXT REPRESENTATION | NAME | SENTIMENT INFORMATION |
|---|---|---|
| (´▽`)ノ | DELIGHTED FACE | POSITIVE |
| orz | FALLEN OVER PERSON | NEGATIVE |
| ＼(˘o˘)／ | CHEERING FACE | POSITIVE |
| (´・ω・`) | DEPRESSED FACE | NEGATIVE |

FIG. 13

| ID | TEXT |
|---|---|
| ... | ... |
| 8 | I JUST DRANK A CUP OF COFFEE. A MORNING CUP OF COFFEE IS YUMMMY (´▽`)ノ |
| 9 | I CALLED IT A DAY! IT'S FRIDAY, I'M GONNA HAVE A DRINK!! |
| 10 | I ATE RAMEN AT WESTGATE OF Y STATION THIS WEEK AS WELL. IT WAS REALLY YUMMMY. |
| ... | ... |

⇩ EXTRACT TOPIC

| LABEL | TOPIC (IN DESCENDING ORDER OF PROBABILITY VALUES OF WORDS) |
|---|---|
| POSITIVE | DRINK, YUMMMY, RAMEN, COFFEE, EAT, FRIDAY, !, .... |
| DELIGHTED FACE | (´▽`)ノ, ♪, ☆, .... |
| ... | ... |

FIG. 15

| TEXT REPRESENTATION | NAME | SENTIMENT INFORMATION |
|---|---|---|
| (\`・ω・´) | EXCITED FACE | NEUTRAL |
| (´▽\`)ノ | DELIGHTED FACE | POSITIVE |
| orz | FALLEN OVER PERSON | NEGATIVE |
| ＼(\`o´)／ | CHEERING FACE | POSITIVE |
| (´・ω・\`) | DEPRESSED FACE | NEGATIVE |

FIG. 17

| CONDITION | NAME | SENTIMENT INFORMATION |
|---|---|---|
| POSITIVE WORD IN DICTIONARY | DICTIONARY POSITIVE | POSITIVE |
| NEGATIVE WORD IN DICTIONARY | DICTIONARY NEGATIVE | NEGATIVE |
| (´∇`)ノ | DELIGHTED FACE | POSITIVE |
| orz | FALLEN OVER PERSON | NEGATIVE |
| ＼(^o^)／ | CHEERING FACE | POSITIVE |
| (´・ω・`) | DEPRESSED FACE | NEGATIVE |

FIG. 18

| SENTIMENT | SENTIMENT REPRESENTATION |
|---|---|
| POSITIVE | GOOD, BEAUTIFUL |
| NEGATIVE | HOT, SORE, CHILLY, COLD, SLUGGISH |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-212825 filed Oct. 10, 2013.

BACKGROUND

Technical Field

The present invention relates to an information processing apparatus, an information processing method, and a non-transitory computer readable medium.

SUMMARY

According to an aspect of the invention, there is provided an information processing apparatus including a receiving unit, a determining unit, a first assigning unit, an extracting unit, a second assigning unit, a modeling unit, and an output unit. The receiving unit receives a target character string. The determining unit determines whether or not a sentiment character string is included in the character string received by the receiving unit, based on a memory that stores a sentiment character string, which is a character string representing a sentiment, and a label representing the sentiment, the sentiment character string and the label being associated with each other. The first assigning unit assigns a label corresponding to a sentiment character string to the character string in a case where the determining unit has determined that the sentiment character string is included in the character string, and assigns plural labels stored in the memory to the character string in a case where the determining unit has determined that no sentiment character string is included in the character string. The extracting unit extracts a word from the character string. The second assigning unit assigns to the word extracted by the extracting unit a label which has been assigned to the character string that includes the word. The modeling unit performs supervised topic modeling for the character string, based on the character string to which the label has been assigned by the second assigning unit, as supervisory information. The output unit outputs a result of a process by the modeling unit.

BRIEF DESCRIPTION OF THE DRAWINGS

Exemplary embodiments of the present invention will be described in detail based on the following figures, wherein:

FIG. 4 is an explanatory diagram illustrating an example of a data structure of target text data;

FIG. 5 is an explanatory diagram illustrating an example of a data structure of a sentiment clue table;

FIG. 6 is an explanatory diagram illustrating an example of a process according to a related art;

FIG. 7 is an explanatory diagram illustrating an example of a process according to a related art;

FIG. 8 is an explanatory diagram illustrating an example of a process according to a related art;

FIG. 9 is an explanatory diagram illustrating an example of a process according to a related art;

FIG. 11 is an explanatory diagram illustrating an example of a process according to an exemplary embodiment;

FIG. 12 is an explanatory diagram illustrating an example of a process according to an exemplary embodiment;

FIG. 13 is an explanatory diagram illustrating an example of a process according to an exemplary embodiment;

FIG. 15 is an explanatory diagram illustrating an example of a data structure of a sentiment clue table;

FIG. 17 is an explanatory diagram illustrating an example of a data structure of a sentiment clue table;

FIG. 18 is an explanatory diagram illustrating an example of a data structure of a sentiment dictionary table;

DETAILED DESCRIPTION

An exemplary embodiment of the present invention will be hereinafter described with reference to the attached drawings.

Figure 1:
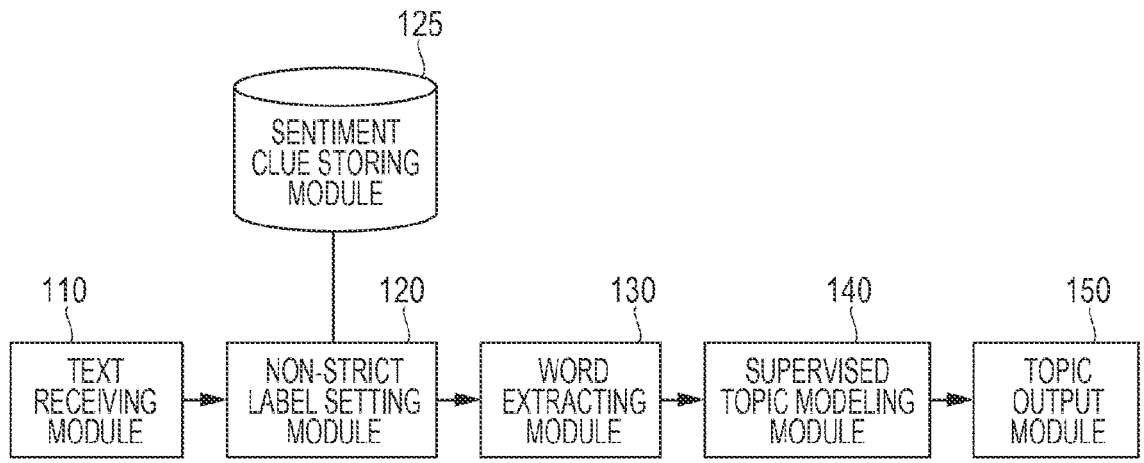
FIG. 1 is a conceptual module configuration diagram illustrating a configuration example of an exemplary embodiment.

FIG. 1 is a conceptual module configuration diagram of a configuration example of an exemplary embodiment.

Generally, the term "module" refers to a component such as software (a computer program), hardware, or the like, which may be logically separated. Therefore, a module in an exemplary embodiment refers not only to a module in a computer program but also to a module in a hardware configuration. Accordingly, through an exemplary embodiment, a computer program for causing the component to function as a module (a program for causing a computer to perform each step, a program for causing a computer to function as each unit, and a program for causing a computer to perform each function), a system, and a method are described. However, for convenience of description, the terms "store", "cause something to store", and other equivalent expressions will be used. When an exemplary embodiment relates to a computer program, the terms and expressions mean "causing a storage device to store", or "controlling a storage device to store". A module and a function may be associated on a one-to-one basis. In the actual implementation, however, one module may be implemented by one program, multiple modules may be implemented by one program, or one module may be implemented by multiple programs. Furthermore, multiple modules may be executed by one computer, or one module may be executed by multiple computers in a distributed computer environment or a parallel computer environment. Moreover, a module may include another module. In addition, the term "connection" hereinafter may refer to logical connection (such as data transfer, instruction, and cross-reference relationship between data) as well as physical connection. The term "being predetermined" represents being set prior to target processing being performed. "Being predetermined" represents not only being set prior to processing in an exemplary embodiment but also being set even after the processing in the exemplary embodiment has started, in accordance with the condition and state at that time or in accordance with the condition and state during a period up to that time, as long as being set prior to the target processing being performed. When there are plural "predetermined values", the values may be different from one another, or two or more values (obviously, including all the values) may be the same. The term "in the case of A, B is performed" represents "a determination as to whether it is A or not is performed, and when it is determined to be A, B is performed", unless the determination of whether it is A or not is not required.

Moreover, a "system" or an "apparatus" may be implemented not only by multiple computers, hardware, apparatuses, or the like connected through a communication unit such as a network (including a one-to-one communication connection), but also by a single computer, hardware, apparatus, or the like. The terms "apparatus" and "system" are used as synonymous terms. Obviously, the term "system" does not include social "mechanisms" (social system), which are only artificially arranged.

Furthermore, for each process in a module or for individual processes in a module performing plural processes, target information is read from a storage device and a processing result is written to the storage device after the process is performed. Therefore, the description of reading from the storage device before the process is performed or the description of writing to the storage device after the process is performed may be omitted. The storage device may be a hard disk, a random access memory (RAM), an external storage medium, a storage device using a communication line, a register within a central processing unit (CPU), or the like.

An information processing apparatus according to an exemplary embodiment extracts a sentiment topic from a target character string (hereinafter, may also be referred to as text). As illustrated in FIG. 1, the information processing apparatus includes a text receiving module 110, a non-strict label setting module 120, a sentiment clue storing module 125, a word extracting module 130, a supervised topic modeling module 140, and a topic output module 150.

Definitions of terms will be provided below.

"Sentiment information" represents association with a human sentiment. Examples of sentiment information include positive, negative, emotions, and the like.

A "word" represents a minimum component of text, such as a word, a morpheme, or the like.

A "topic" represents a multinomial distribution of words output based on latent Dirichlet allocation (LDA) and a related method. For topics, related words have high probability values. Regarding the term "topic", a different term, such as a cluster, a latent class, or the like, may be used in a method similar to the LDA.

A "sentiment topic" represents a topic associated with certain sentiment information. A sentiment topic is, for example, a positive topic, a negative topic, or the like.

A "label" represents a feature assigned to text. Labels include manually assigned labels and mechanically assigned labels based on rules. A label is, for example, positive, negative, or the like.

An "emoticon" represents text representation which is strongly associated with a sentiment. Examples of emoticons include smileys, such as ":-)" (happy face), "orz" (fallen over person), and the like. A smiley represents facial expression or the like by a combination of characters and/or symbols. Emoticons may include pictorial symbols each represented by a single code.

A "sentiment clue" represents a pair of a specific sentiment representation (sentiment information) and an emoticon or the like which is strongly associated with the specific sentiment representation. A sentiment clue is, for example, a pair of ":-)" and "positive", or the like.

The text receiving module 110 is connected to the non-strict label setting module 120. The text receiving module 110 receives a target character string. Here, a character string represents a series of characters. For example, a character string is text posted through a social networking service (SNS), or the like.

The sentiment clue storing module 125 is connected to the non-strict label setting module 120. The sentiment clue storing module 125 stores a sentiment character string, which is a character string representing a sentiment, and a label representing the sentiment in association with each other. That is, the sentiment clue storing module 125 is a database (DB) in which sentiment clues are stored.

The sentiment clue storing module 125 may include a label which negates a sentiment as a label.

Further, a sentiment character string stored in the sentiment clue storing module 125 may be a smiley.

The non-strict label setting module 120 is connected to the text receiving module 110, the sentiment clue storing module 125, and the word extracting module 130. The non-strict label setting module 120 determines, based on the sentiment clue storing module 125, whether or not a sentiment character string within the sentiment clue storing module 125 is included in a character string received by the text receiving module 110. When it has been determined that a sentiment character string is included in the received character string, the non-strict label setting module 120 assigns labels corresponding to the sentiment character string to the received character string. When it has been determined that a sentiment character string is not included in the received character string, the non-strict label setting module 120 assigns plural labels included in the sentiment clue storing module 125 to the received character string. That is, the non-strict label setting module 120 sets a label for text in accordance with a sentiment clue within the sentiment clue storing module 125.

In the case where it has been determined that a sentiment character string is included in the received character string and a label corresponding to the sentiment character string is a label which negates a sentiment, the non-strict label setting module 120 may assign a label representing a sentiment different from the negated sentiment to the character string received by the text receiving module 110. A "label representing a sentiment B, which is different from a sentiment A" represents a label which is stored in the sentiment clue storing module 125 and which represents the sentiment B, which is different from the negated sentiment A.

The term "non-strict" in processing of the non-strict label setting module 120 will be explained below. The non-strict label setting module 120 sets a label according to a standard that is less strict than label setting in a typical text classification. A label setting standard in a typical text classification is, for example, a standard in a text classification method using Support Vector Machine targeting Reuters-21578 described in Chapter 13, Section 6 of Christopher D. Manning, Prabhakar Raghavan, and Hinrich Schutze, "Text Classification and Naive Bayes", in Introduction to Information Retrieval, pages 234-265, Cambridge University Press, 2008. Specifically, in the technique described in Manning et al. (2008), setting is performed such that a label assigned to text is directly used. For example, labels "livestock" and "hog" set for data are used for an article on an America pork congress.

The word extracting module 130 is connected to the non-strict label setting module 120 and the supervised topic modeling module 140. The word extracting module 130 extracts a word from a character string received by the text receiving module 110.

The supervised topic modeling module 140 is connected to the word extracting module 130 and the topic output module 150. The supervised topic modeling module 140 assigns to words extracted by the word extracting module 130 labels which has been assigned to a character string which includes the words. The supervised topic modeling module 140 performs supervised topic modeling for words received by the word extraction module 130, based on labels that have been assigned by the non-strict label setting module 120, as supervisory information. That is, the supervised topic modeling module 140 performs supervised topic modeling for text from which labels and words are extracted.

The topic output module 150 is connected to the supervised topic modeling module 140. The topic output module 150 outputs a topic associated with a sentiment label, which is a processing result by the supervised topic modeling module 140. The topic output module 150 outputs, for example, a topic table 1100 represented in an example of FIG. 11, which will be described later.

Figure 2:
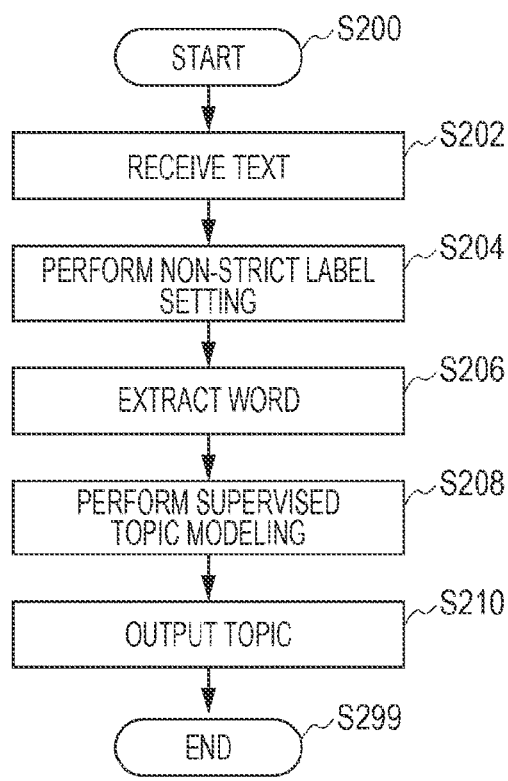
FIG. 2 is a flowchart illustrating an example of a process according to an exemplary embodiment.

FIG. 2 is a flowchart illustrating an example of a process according to an exemplary embodiment.

In step S202, the text receiving module 110 receives plural pieces of target text. Processing of receiving plural pieces of text in step S202 may be performed collectively or sequentially. The text receiving module 110 receives, for example, target text data 400. FIG. 4 is an explanatory diagram illustrating an example of a data structure of the target text data 400. The target text data 400 includes an ID column 410 and a text column 420. In this exemplary embodiment, an identification (ID) for uniquely identifying each piece of text is stored in the ID column 410. Plural pieces of target text are stored in the text column 420.

In step S204, the non-strict label setting module 120 sets labels for the text on the basis of sentiment clues. Here, label setting is performed according to a non-strict standard. Label setting will be described later with reference to FIG. 3.

In step S206, the word extracting module 130 extracts words from the text. In the case of Japanese, morphemes are extracted as words with a morphology analyzer (MeCab etc.). In the case of a language such as English in which a sentence is written with a space between words, character strings separated by spaces may each be extracted as words.

In step S208, the supervised topic modeling module 140 performs supervised topic modeling for the text from which labels and words have been extracted. As a supervised topic modeling method, for example, partially labeled Dirichlet allocation (PLDA), which permits multi-labeling (described in Daniel Ramage, Chistopher D. Manning, and Susan Dumais, "Partially Labeled Topic Models for Interpretable Text Mining", in Proceedings of the 17th ACM SIGKDD International Conference on Knowledge Discovery and Data Mining, pages 457-465, 2011), or the like is used.

In step S210, the topic output module 150 outputs topics associated with sentiment labels.

Figure 3:
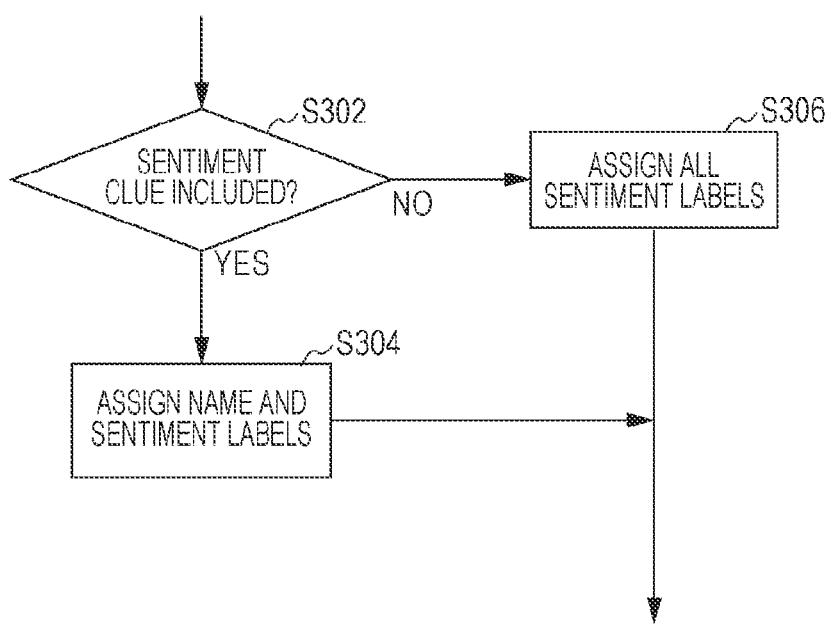
FIG. 3 is a flowchart illustrating an example of a process according to an exemplary embodiment.

FIG. 3 is a flowchart illustrating an example of a process by the non-strict label setting module 120 according to an exemplary embodiment. This process is an example of the processing of step S204 in the flowchart illustrated in FIG. 2.

In step S302, it is determined whether or not each piece of text includes a sentiment clue. The processing of step S302 is performed with reference to, for example, a sentiment clue table 500. FIG. 5 is an explanatory diagram illustrating an example of a data structure of the sentiment clue table 500. The sentiment clue table 500 includes, as data of sentiment clues, a text representation column 510, a name column 520, and a sentiment information column 530. Text representation such as emoticons is stored in the text representation column 510. Names of the emoticons or the like are stored in the name column 520. Sentiment information of the emoticons or the like is stored in the sentiment information column 530. The sentiment clue table 500 may not include the name column 520 or may further include a different type of information as long as the sentiment clue table 500 includes at least a combination of the text representation column 510 and the sentiment information column 530.

In step S304, a name and sentiment information are set as labels for target text. For example, to text and a sentiment clue with the ID of 2 in the target text data 400 illustrated in the example of FIG. 4, "('-ω-')", which is a "depressed face" label and a "negative" label are assigned.

In step S306, all the pieces of sentiment information are set as labels for the target text. For example, since text with the ID of 1 in the target text data 400 illustrated in the example of FIG. 4 has no text representation within the text representation column 510 of the sentiment clue table 500, all the labels within the sentiment information column 530, "positive" and "negative", are assigned to the text with the ID of 1.

Examples of processes according to related arts will be explained with reference to FIGS. 6 to 10. Subsequently, an example of a process according to an exemplary embodiment will be explained with reference to FIG. 11.

FIG. 6 is an explanatory diagram illustrating an example of a process according to a related art (David M. Blei, Andrew Y. Ng, and Michael I. Jordan, "Latent Dirichlet Allocation", Journal of Machine Learning Research, 3: 993-1022, 2003). Here, a topic table 600 is generated as a result of a process for the target text data 400 illustrated in the example of FIG. 4. The topic table 600 includes a sentiment information column 610 and a topic column 620. However, the sentiment information column 610 is not used. Topics extracted from text are stored (in descending order of probability values of words) in the topic column 620. That is, although topics are extracted according to the co-occurrence of words in text, sentiment information is not associated with a topic. In the example of FIG. 6, in the topic table 600, each word for the topic in the first line is underlined with a dashed line, each word for the topic in the second line is underlined with a thin line, and each word for topics in the third line is underlined with a thick line.

In the examples illustrated in FIGS. 6 to 11, some nouns are deleted in an arbitrary manner (e.g. TV in the ID of 1). Obviously, these words may be included in a topic. Further, in extraction of topics, words such as inflected adjectives and verbs are extracted in their original forms. These words may be normalized with a technique such as lemmatization. Furthermore, prepositions and auxiliary verbs are excluded from elements of topics.

FIG. 7 is an explanatory diagram illustrating an example of a process according to a related art (Daniel Ramage, Susan Dumais, and Dan Liebling, "Characterizing Microblogs with Topic Models" in Proceedings of the Fourth International AAAI Conference on Weblogs and Social Media, pages 130-137, 2010). Here, a topic table 700 is generated as a result of a process for the target text data 400 illustrated in the example of FIG. 4. The topic table 700 includes an emoticon column 710, a sentiment information column 720, and a topic column 730. Emoticons are stored in the emoticon column 710. Sentiment information corresponding to the emoticons is stored in the sentiment information column 720. Topics corresponding to the emoticons (sentiment information) are stored (in descending order of probability values of words) in the topic column 730. That is, in this example, topics corresponding to emoticons/sentiment information are extracted.

In addition, in this example, text including no emoticon (e.g. text not including an underlined word as in the example of the ID of 9) is not used for extraction of a sentiment topic.

FIG. 8 is an explanatory diagram illustrating an example of a process according to a related art (Chenghua Lin, Yulan He, Richard Everson, and Stefan Ruger, "Weakly Supervised Joint Sentiment-topic Detection from Text", IEEE Transactions on Knowledge and Data Engineering, 24 (Issue 6): 1134-1145, 2012). A topic table 800 is generated as a result of a process for the target text data 400 illustrated in the example of FIG. 4. In this example, in a sentiment representation dictionary, for example, "good", "beautiful", and the like are defined as words corresponding to "positive", and "hot", "sore", "chilly", "cold", "sluggish", and the like are defined as words corresponding to "negative". If these words are included in text, the topic table 800 may be generated. The topic table 800 includes a sentiment information column 810 and a topic column 820. Sentiment information is stored in the sentiment information column 810. Topics corresponding to the sentiment information are stored (in descending order of probability values of words) in the topic column 820.

That is, sentiment topics are extracted dependent on a sentiment representation dictionary. For example, an uncommon representation (not registered in a sentiment representation dictionary), such as "yummmy", may not be associated with "positive" or "negative.

FIG. 9 is an explanatory diagram illustrating an example of a process according to Japanese Unexamined Patent Application Publication No. 2013-134751. A topic table (unsupervised) 920 is generated as a result of a process for the target text data 400 illustrated in the example of FIG. 4.

Figure 10:
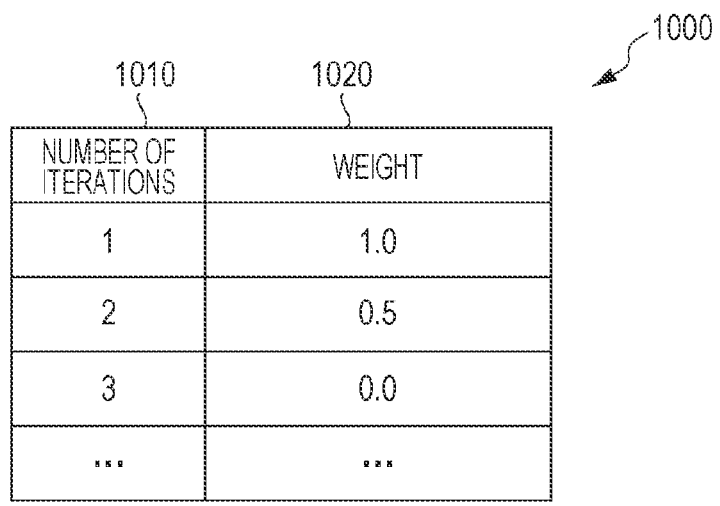
FIG. 10 is an explanatory diagram illustrating an example of a data structure of a weight adjustment table.

First, supervised topic extraction is performed for the target text data 400 to generate a topic table (supervised) 910. The topic table (supervised) 910 includes an emoticon column 912, a sentiment information column 914, and a topic column 916. Emoticons are stored in the emoticon column 912. Sentiment information corresponding to the emoticons is stored in the sentiment information column 914. Topics corresponding to the emoticons (sentiment information) are stored (in descending order of probability values of words) in the topic column 916. Then, unsupervised topic extraction is performed for the target text data 400, and the topic table (supervised) 910 is biased using a weight adjustment table storing module 930, so that the topic table (unsupervised) 920 is generated. The topic table (unsupervised) 920 includes a sentiment information column 922 and a topic column 924. Sentiment information is stored in the sentiment information column 922. Topics corresponding to the sentiment information are stored (in descending order of probability values of words) in the topic column 924. Here, biasing represents that linear interpolation between supervised posterior probability and unsupervised posterior probability in a topic is performed using weight. In order to perform linear interpolation, a weight adjustment table 1000 within the weight adjustment table storing module 930 is used. FIG. 10 is an explanatory diagram illustrating an example of a data structure of a topic table. The weight adjustment table 1000 includes a number-of-iterations column 1010 and a weight column 1020. The number of iterations (repetitions) is stored in the number-of-iterations column 1010. Weighting values corresponding to the numbers of iterations are stored in the weight column 1020. That is, in iteration processing based on EM algorithm, weighting values corresponding to the numbers of iterations are set in the weight adjustment table 1000. In the case of this related art, optimal weighting values vary according to data.

FIG. 11 is an explanatory diagram illustrating an example of a process according to an exemplary embodiment. A topic table 1100 is generated as a result of a process for the target text data 400 illustrated in the example of FIG. 4. The topic table 1100 includes a sentiment information column 1110 and a topic column 1120. Sentiment information is stored in the sentiment information column 1110. Topics corresponding to the sentiment information are stored (in descending order of probability values of words) in the topic column 1120. For example, the topic table 1100 is generated by extracting topics with the supervised topic modeling module 140 based on parameters in which two lines for "positive", one line for "negative", and one line for a "delighted face" are provided. More specifically, topic modeling is performed for text with the IDs of 8, 9, and 10 as "positive (A)", text with the IDs of 1, 3, and 6 as "positive (B)", and text with the IDs of 2, 4, 5, and 7 as "negative". For each emoticon, such as a "delighted face", a topic corresponding to the emoticon is generated. The emoticon and a frequently appearing co-occurrence word are extracted as a topic of a name label (the name column 520 of the sentiment clue table 500 illustrated in the example of FIG. 5), and a sentiment topic is extracted based on the co-occurrence of the word and the emoticon. Depending on the topic modeling, plural sentiments may be included in a piece of text.

Further, in this exemplary embodiment, target text of topic extraction is not limited to emoticons and a sentiment representing dictionary. Therefore, even with text with the ID of 9 in the target text data 400, a topic may be extracted. Although this is also applied to the related art described in Japanese Unexamined Patent Application Publication No. 2013-134751, a weight adjustment table is used in the technique described in Japanese Unexamined Patent Application Publication No. 2013-134751, thereby causing a difficulty in adjustment.

Extraction of a sentiment topic without a weight adjustment table is implemented with the non-strict label setting module 120. In addition, a clue and sentiment mixed topic is suppressed from being formed. Further, the sentiment clue storing module 125 is used for label assigning, and is able to set a sentiment of a negation condition.

Processing performed by the non-strict label setting module 120 will be explained below in more detail. FIG. 12 is an explanatory diagram illustrating an example of a process according to an exemplary embodiment. A sentiment clue table 1200 is equivalent to the sentiment clue table 500 illustrated in the example of FIG. 5.

In the processing of step S304 by the non-strict label setting module 120, for example, a label assigning reference area 1250 is used. That is, since a word in text ID of 8 in the target text data 400 illustrated in FIG. 4 is directly associated with a sentiment clue (a word within text is identical to text representation in a text representation column 1210), corresponding sentiment information is assigned to the text.

In the processing of step S306 by the non-strict label setting module 120, for example, a label assigning reference area 1260 is used. That is, since sentiment information associated with words in text IDs of 1 in the target text data 400 illustrated in FIG. 4 is uncertain, it is assumed that the text is associated with all the pieces of predetermined sentiment information (sentiment information within a sentiment information column 1230). Here, a sentiment with negation "¬" is treated as a sentiment without negation (developed form of a sentiment that is different from the negated sentiment).

Next, the processing of step S306 performed by the non-strict label setting module 120 will be described in detail. FIG. 13 is an explanatory diagram illustrating an example of a process according to an exemplary embodiment. The target text data 400 illustrated in the example of FIG. 13 is an extraction of text with the IDs of 8, 9, and 10 of the target text data 400 illustrated in the example of FIG. 4. A topic table 1300 is an extraction of a line of "positive (A)" and a line of a "delighted face" of the topic table 1100 illustrated in the example of FIG. 11.

Words in text with the ID of 8 including an emoticon corresponding to a delighted face are likely to belong to a "positive" or "delighted face" topic.

Since words in text with the IDs of 9 and 10 including no emoticon include "drink" and "yummmy" in text with the ID of 8, these words are likely to belong to a "positive" topic.

Furthermore, since "('∇')/" appears only in text with the ID of 8, this is integrated into a "delighted face" topic in the topic table 1300.

Figure 14:
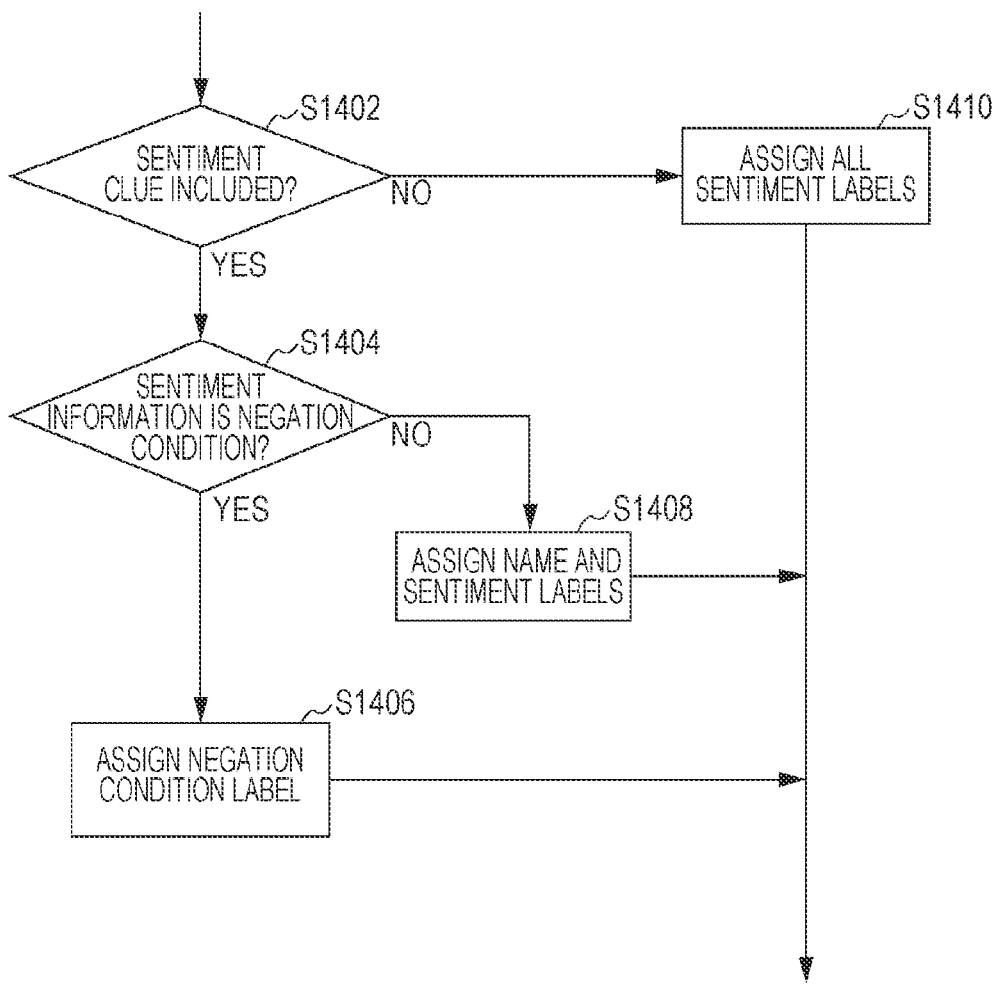
FIG. 14 is a flowchart illustrating another example of a process according to an exemplary embodiment.

FIG. 14 is a flowchart illustrating another example of a process according to an exemplary embodiment. In this process, the flowchart illustrated in the example of FIG. 14 is used instead of the flowchart illustrated in the example of FIG. 3. FIG. 15 is an explanatory diagram illustrating an example of a data structure of a sentiment clue table 1500. The sentiment clue table 1500 includes a text representation column 1510, a name column 1520, and a sentiment information column 1530. The sentiment clue table 1500 has a data structure equivalent to the data structure of the sentiment clue table 500 illustrated in the example of FIG. 5. However, the sentiment clue table 1500 includes negation sentiment information as sentiment information to be stored in the sentiment information column 1530.

In step S1402, it is determined whether or not a sentiment clue is included. In the case where a sentiment clue is included, the process proceeds to step S1404. In the case where no sentiment clue is included, the process proceeds to step S1410. The processing of step S1402 is equivalent to the processing of step S302.

In step S1404, it is determined whether or not sentiment information is a negation condition. In the case where sentiment information is a negation condition, the process proceeds to step S1406. In the case where sentiment information is not a negation condition, the process proceeds to step S1408. For example, as in the first line of the sentiment clue table 1500 illustrated in the example of FIG. 15, the case of "¬ neutral" corresponds to a negation condition. This is because in this case a sentiment for an excited face is interpreted from the context of the text including the excited face.

In step S1406, a negation sentiment label is assigned. More specifically, sentiment labels other than "neutral" (in this case, "positive" and "negative") are assigned, using a label assigning reference area 1550 of the sentiment clue table 1500.

In step S1408, name and sentiment labels are assigned. The processing of step S1408 is equivalent to the processing of step S304.

In step S1410, all sentiment labels are assigned. The processing of step S1410 is equivalent to the processing of step S306. More specifically, sentiment labels are assigned, using a label assigning reference area 1560 of the sentiment clue table 1500. Here, however, a negation sentiment label is not assigned. That is, name labels and all the sentiment labels other than "negation" (in this case, "positive" and "negative") are assigned.

Figure 16:
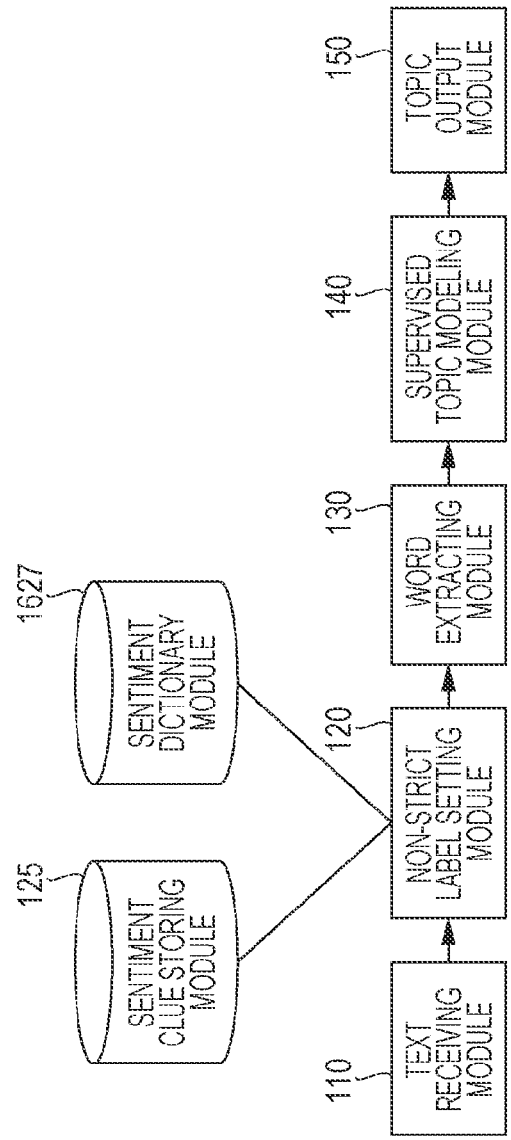
FIG. 16 is a conceptual module configuration diagram of another configuration example of an exemplary embodiment.

FIG. 16 is a conceptual module configuration diagram of another configuration example of an exemplary embodiment. The information processing apparatus includes the text receiving module 110, the non-strict label setting module 120, the sentiment clue storing module 125, a sentiment dictionary module 1627, the word extracting module 130, the supervised topic modeling module 140, and the topic output module 150. That is, the sentiment dictionary module 1627 is added to the information processing apparatus illustrated in the example of FIG. 1. The same reference labels are assigned to the same kind of components, and explanation for those components will be omitted.

The sentiment clue storing module 125 is connected to the non-strict label setting module 120. The sentiment clue storing module 125 stores, in cooperation with the sentiment dictionary module 1627, words representing sentiments as sentiment character strings. For example, a sentiment clue table 1700 is stored in the sentiment clue storing module 125. FIG. 17 is an explanatory diagram illustrating an example of a data structure of a sentiment clue table. The sentiment clue table 1700 includes a condition column 1710, a name column 1720, and a sentiment information column 1730. An application condition of a word is stored in the condition column 1710. Here, an application condition includes text representation, such as emoticons, stored in the text representation column 510 of the sentiment clue table 500 and is linked with sentiment representation within the sentiment dictionary module 1627. The name column 1720 is equivalent to the name column 520 of the sentiment clue table 500 and stores names. The sentiment information column 1730 is equivalent to the sentiment information column 530 of the sentiment clue table 500 and stores sentiment information.

The sentiment dictionary module 1627 is connected to the non-strict label setting module 120. The sentiment dictionary module 1627 stores words representing sentiments as sentiment character strings. For example, a sentiment dictionary table 1800 is stored in the sentiment dictionary module 1627. FIG. 18 is an explanatory diagram illustrating an example of a data structure of the sentiment dictionary table 1800. The sentiment dictionary table 1800 includes a sentiment column 1810 and a sentiment representation column 1820. The sentiment column 1810 stores sentiment information. The sentiment representation column 1820 stores specific sentiment representation representing the sentiment information. For example, "good", "beautiful", and the like are stored as sentiment representation representing "positive" sentiment information, and "hot", "sore", "chilly", "cold", "sluggish", and the like are stored as sentiment representation representing "negative" sentiment information.

The non-strict label setting module 120 is connected to the text receiving module 110, the sentiment clue storing module 125, the sentiment dictionary module 1627, and the word extracting module 130. The non-strict label setting module 120 has a function equivalent to the non-strict label setting module 120 illustrated in the example of FIG. 1. Furthermore, in the case where the condition column 1710 of the sentiment clue table 1700 within the sentiment clue storing module 125 represents "positive word in dictionary", the non-strict label setting module 120 extracts a sentiment representation within the sentiment representation column 1820 for which the sentiment column 1810 of the sentiment dictionary table 1800 within the sentiment dictionary module 1627 represents "positive". In contrast, in the case where the condition column 1710 represents "negative word in dictionary", the non-strict label setting module 120 extracts a sentiment representation within the sentiment representation column 1820 for which the sentiment column 1810 of the sentiment dictionary table 1800 within the sentiment dictionary module 1627 represents "negative". Then, the non-strict label setting module 120 determines whether or not the corresponding sentiment representation exists within the target text. That is, by linking with the sentiment dictionary module 1627, the non-strict label setting module 120 allows a sentiment character string to include a word representing a sentiment. Obviously, a word representing a sentiment may be directly stored in the condition column 1710 of the sentiment clue table 1700.

Similar to the non-strict label setting module 120 illustrated in the example of FIG. 1, there are a case where a label assigning reference area 1750 of the sentiment clue table 1700 is used (processing of step S304 or step S1408) and a case where a label assigning reference area 1760 of the sentiment clue table 1700 is used (processing of step S306 or step S1410). With the use of the sentiment dictionary module 1627, the non-strict label setting module 120 improves the performance of extraction of a topic associated with sentiment information.

Figure 19:
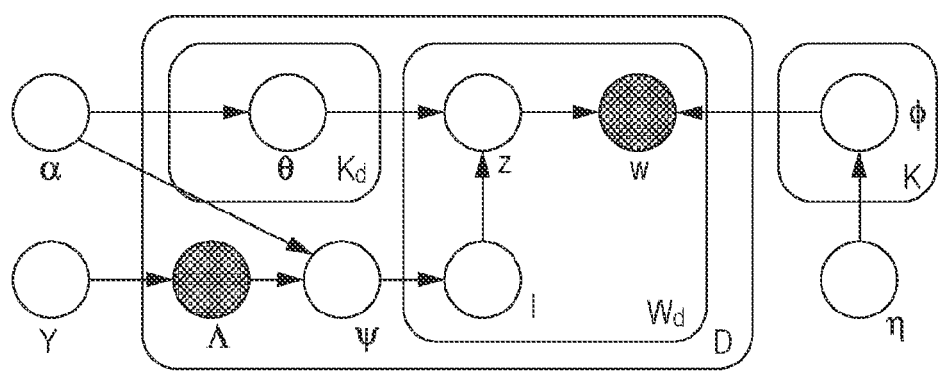
FIG. 19 is an explanatory diagram illustrating an example of a process based on PLDA.

Next, processing of the supervised topic modeling module 140 will be described below. FIG. 19 is an explanatory diagram illustrating an example of a process based on PLDA. This process is a known technique.

Next, a generation algorithm of PLDA will be described as follows:
 For each topic k∈{1 ... K},
  select $\phi_k$~Dir(η)
 For each document d∈{1 ... D},
  each document label j∈$\Lambda_d$ (observed label)
   select $\theta_{d,j}$~Dir(α)
  select $\psi_d$~Dir(α) of size |$\Lambda_d$|
  For each word w∈$W_d$,
   select labels l~Mult ($\psi_d$)
   select topics z~Mult ($\theta_{d,j}$)
   select words w~Mult ($\phi_z$)

In the above algorithm, "Dir(•)" represents Dirichlet distribution, and "Mult(•)" represents multinomial distribution. In PLDA, $\phi$, $\psi$, and $\theta$ that are optimal for a document set are required to be calculated. A method for efficiently calculating optimal $\phi$, $\psi$, and $\theta$ is described in Ramage et al. (2011).

Figure 20:
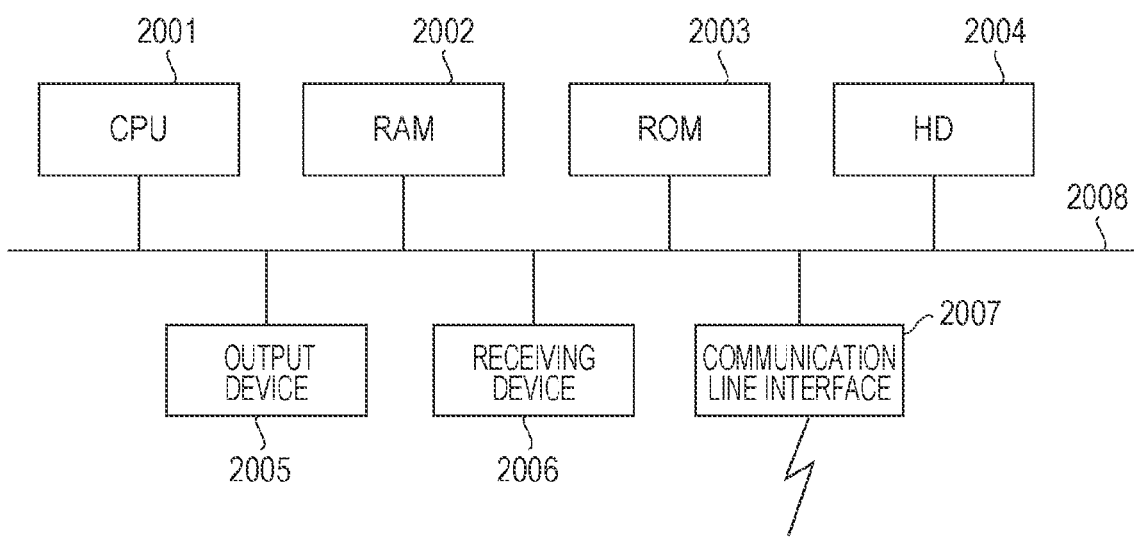
FIG. 20 is a block diagram illustrating an example of a hardware configuration of a computer which implements an exemplary embodiment.

A hardware configuration of a computer which executes a program according to an exemplary embodiment is, as illustrated in FIG. 20, a general computer, and more specifically, a personal computer, a computer which may serve as a server, or the like. That is, for example, the computer includes a CPU 2001 as a processing unit (arithmetic unit) and a RAM 2002, a read only memory (ROM) 2003, and an HD 2004 as memories. The HD 2004 may be, for example, a hard disk. The computer includes the CPU 2001 which executes programs, such as the text receiving module 110, the non-strict label setting module 120, the word extracting module 130, the supervised topic modeling module 140, and the topic output module 150, the RAM 2002 which stores the programs and data, the ROM 2003 which stores a program for booting the computer, or the like, the HD 2004 serving as an auxiliary storage device (may be a flash memory or the like) having functions of the sentiment clue storing module 125, the sentiment dictionary module 1627, and the like, a receiving device 2006 which receives data based on a user operation on a keyboard, a mouse, a touch panel, or the like, an output device 2005, such as a cathode ray tube (CRT), a liquid crystal display, or the like, a communication line interface 2007 which allows connection with a communication network such as a network interface card, and a bus 2008 which connects the above-mentioned devices for data communication. Plural computers having the above-described configuration may be connected to one another via a network.

An exemplary embodiment of the foregoing exemplary embodiments that concerns a computer program may be implemented by causing a system having the above-mentioned hardware configuration to read a computer program, which is software, and allowing the software and hardware resources to cooperate together.

The hardware configuration illustrated in FIG. 20 is merely a configuration example. The exemplary embodiments are not limited to the configuration illustrated in FIG. 20 as long as modules explained in the exemplary embodiments may be executed. For example, some modules may be configured to be dedicated hardware (for example, an application specific integrated circuit (ASIC)), some modules may be located in an external system that may be connected via a communication line, or plural systems illustrated in FIG. 20 may be connected to one another via a communication line so that they cooperate together. Furthermore, in particular, the modules may be incorporated in a home information appliance, a copying machine, a facsimile machine, a scanner, a printer, a multifunction machine (image processing apparatus having two or more of functions of a scanner, a printer, a copying machine, a facsimile machine, and the like), or the like, as well as a personal computer.

The programs described above may be stored in a recording medium and provided or may be supplied through communication. In this case, for example, the program described above may be considered as an invention of "a computer-readable recording medium which records a program".

"A computer-readable recording medium which records a program" represents a computer-readable recording medium which records a program to be used for installation, execution, and distribution of the program.

A recording medium is, for example, a digital versatile disc (DVD), including "a DVD-R, a DVD-RW, a DVD-RAM, etc.", which are the standards set by a DVD forum, and "a DVD+R, a DVD+RW, etc.", which are the standards set by a DVD+RW, a compact disc (CD), including a read-only memory (CD-ROM), a CD recordable (CD-R), a CD rewritable (CD-RW), etc., a Blu-Ray™ Disc, a magneto-optical disk (MO), a flexible disk (FD), a magnetic tape, a hard disk, a ROM, an electrically erasable programmable read-only memory (EEPROM™), a flash memory, a RAM, a secure digital (SD) memory card, or the like.

The program described above or part of the program may be recorded in the above recording medium, to be stored and distributed. Furthermore, the program may be transmitted through communication, for example, a wired network or a wireless communication network used for a local area network (LAN), a metropolitan area network (MAN), a wide area network (WAN), the Internet, an intranet, an extranet, or the like, or a transmission medium of a combination of the above networks. Alternatively, the program or a part of the program may be delivered by carrier waves.

The above-mentioned program may be part of another program or may be recorded in a recording medium along with a different program. Further, the program may be divided and recorded into multiple recording media. The program may be stored in any format, such as compression or encryption, as long as the program may be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to execute:
a receiving unit that receives a target character string;
a determining unit that determines whether or not a sentiment character string is included in the character string received by the receiving unit, based on a memory that stores a sentiment character string, which is a character string representing a sentiment, and a label representing the sentiment, the sentiment character string and the label being associated with each other;
a first assigning unit that assigns a label corresponding to a sentiment character string to the character string in a case where the determining unit has determined that the sentiment character string is included in the character string, and that assigns a plurality of label stored in the memory to the character string in a case where the determining unit has determined that no sentiment character string is included in the character string;
an extracting unit that extracts a word from the character string;
a second assigning unit that assigns to the word extracted by the extracting unit a label which has been assigned to the character string that includes the word;
a modeling unit that performs supervised topic modeling for the character string, based on the character string to which the label has been assigned by the second assigning unit, as supervisory information; and
an output unit that outputs a result of a process by the modeling unit.

2. The information processing apparatus according to claim 1,
wherein the memory stores a label which negates a sentiment as a label, and
wherein in a case where the determining unit has determined that a sentiment character string is included in the character string and a label corresponding to the sentiment character string is a label which negates a sentiment, the first assigning unit assigns a label representing a sentiment different from the negated sentiment to the character string.

3. The information processing apparatus according to claim 1, wherein the sentiment character string stored in the memory is a smiley.

4. The information processing apparatus according to claim 2, wherein the sentiment character string stored in the memory is a smiley.

5. The information processing apparatus according to claim 3, wherein the sentiment character string stored in the memory includes a word representing a sentiment.

6. The information processing apparatus according to claim 4, wherein the sentiment character string stored in the memory includes a word representing a sentiment.

7. An information processing method comprising:
receiving, by at least one processor, a target character string;
determining, by the at least one processor, whether or not a sentiment character string is included in the received character string, based on storing a sentiment character string, which is a character string representing a sentiment, and a label representing the sentiment, the sentiment character string and the label being associated with each other;
assigning, by the at least one processor, a label corresponding to a sentiment character string to the character string in a case where it has been determined that the sentiment character string is included in the character string, and assigning, by the at least one processor, a plurality of stored labels to the character string in a case where it has been determined that no sentiment character string is included in the character string;
extracting, by the at least one processor, a word from the character string;
assigning, by the at least one processor, to the extracted word a label which has been assigned to the character string that includes the word;
performing, by the at least one processor, supervised topic modeling for the character string, based on the character string to which the label has been assigned, as supervisory information; and
outputting, by the at least one processor, a result of a process.

8. A non-transitory computer readable medium storing a program causing a computer to execute a process for information processing, the process comprising:
receiving, by at least one processor, a target character string;
determining, by the at least one processor, whether or not a sentiment character string is included in the received character string, based on storing a sentiment character string, which is a character string representing a sentiment, and a label representing the sentiment, the sentiment character string and the label being associated with each other;
assigning, by the at least one processor, a label corresponding to a sentiment character string to the character string in a case where it has been determined that the sentiment character string is included in the character string, and assigning, by the at least one processor, a plurality of stored labels to the character string in a case where it has been determined that no sentiment character string is included in the character string;
extracting, by the at least one processor, a word from the character string;
assigning, by the at least one processor, to the extracted word a label which has been assigned to the character string that includes the word;
performing, by the at least one processor, supervised topic modeling for the character string, based on the character string to which the label has been assigned, as supervisory information; and
outputting, by the at least one processor, a result of a process.

* * * * *